(12) United States Patent
Eslambolchi et al.

(10) Patent No.: US 6,195,897 B1
(45) Date of Patent: Mar. 6, 2001

(54) ENCAPSULANT REMOVAL TOOL FOR FIBER OPTIC CABLES

(75) Inventors: Hossein Eslambolchi, Basking Ridge, NJ (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/303,968

(22) Filed: May 3, 1999

(51) Int. Cl.$^7$ .................................................... B26B 25/00
(52) U.S. Cl. .............................. 30/90.1; 30/124; 30/276; 30/307
(58) Field of Search ..................... 30/43.4, 43.6, 30/90.1, 90.3, 93, 101, 102, 133, 124, 276, 306, 307

(56) References Cited

U.S. PATENT DOCUMENTS

| | | | |
|---|---|---|---|
| 1,615,134 | * | 1/1927 | Price ........................................ 30/306 |
| 1,928,718 | * | 10/1933 | Covey ...................................... 30/276 |
| 2,563,483 | * | 8/1951 | O'Hagan ................................. 30/102 |
| 4,945,636 | * | 8/1990 | Takizawa ............................... 30/90.1 |
| 4,985,999 | * | 1/1991 | Iwasaki et al. ........................ 30/43.6 |
| 5,461,783 | * | 10/1995 | Henderson ............................. 30/133 |
| 5,829,145 | * | 11/1998 | Hughes ................................... 30/306 |
| 5,862,595 | * | 1/1999 | Keane ..................................... 30/124 |

* cited by examiner

Primary Examiner—Hwei-Siu Payer

(57) ABSTRACT

A cutting tool for removing encapsulant surrounding a fiber optic cable splice includes a rotating cutting head, with the head coupled through a vacuum tube to a collection bag. The cutting head preferably includes alternating rows of cutting blades and brushes, where the brushes function to direct the debris from the cutting head into the vacuum tube.

5 Claims, 2 Drawing Sheets

ENCAPSULANT REMOVAL TOOL FOR FIBER OPTIC CABLES

TECHNICAL FIELD

The present invention relates to an encapsulant removal tool and cutting method or fiber optic cables and, more particularly, to a hand-held, motor-driven tool and method for cutting away encapsulant material during repair of the cable.

BACKGROUND OF THE INVENTION

During the installation of fiber optic routes, the fiber optic cables are installed in reel lengths that range, for example, from 10,000 to 16,000 feet. For extended routes, the cables must be spliced together, maintaining continuity of each optical path contained within the cables. Once these splices are made, they are housed in a metallic enclosure for safety and security. For further protection from harsh environments, the metallic enclosure may be disposed within a high-density polyethylene (HDPE) enclosure and thereafter sealed with an encapsulant comprising a foam rubber-based solution. The encapsulant is intended to prevent water and other debris from entering the splice enclosure.

While most conventional encapsulants provide the necessary protection, it is difficult to remove this foam-based material when a particular splice needs to be repaired or replaced. A conventional approach to removing the encapsulant is to simply use a "skinning knife" to cut away the material. Such a technique is often dangerous to the person performing the repair, and may also result in damaging the optic cables within the splice (such as by accidentally cutting through all of the enclosures and inadvertently cutting one or more cables). Thus, a need remains for an improved method of removing encapsulant from a fiber optic cable.

SUMMARY OF THE INVENTION

The need remaining in the prior art is addressed by the present invention, which relates to an encapsulant removal tool and cutting method for fiber optic cables and, more particularly, to a hand-held, motor-driven tool and method for cutting away encapsulant material during repair of the cable.

In accordance with the present invention, an encapsulant removal tool is formed to include a cutting head including a plurality of rotating blades, interleaved with a plurality of brushes. A battery-operated DC motor is used to rotate the cutting head and thereby provide the cutting action for the tool. A vacuum motor is included and also battery-driving to provide a vacuum force pulling underneath the cutting head. The vacuum functions to easily and quickly remove the encapsulant debris from the cutting area.

In a preferred embodiment of the present invention, a collection bag and hose are coupled to the tool so that the encapsulant debris may be collected and disposed of in an efficient manner.

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
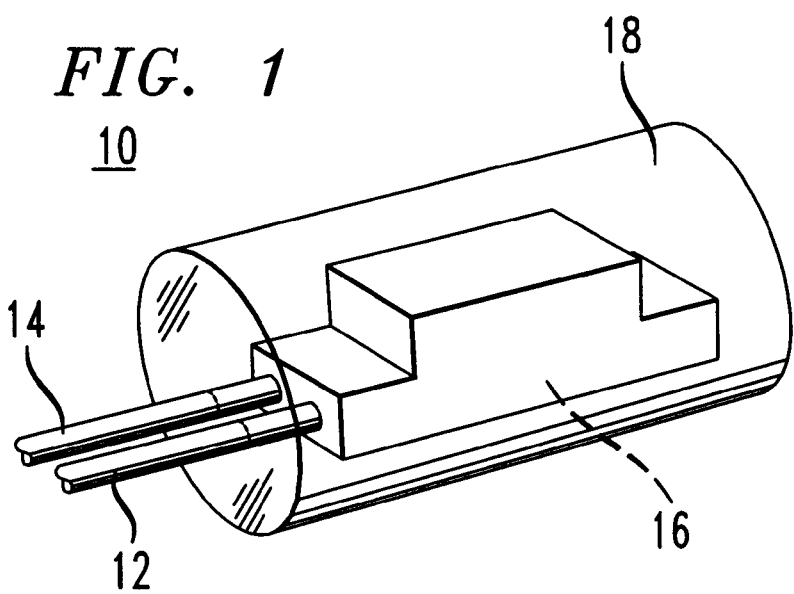
FIG. 1 illustrates an exemplary fiber optic cable splice, housed in an encapsulant material.

FIG. 1 illustrates a conventional fiber optic splice arrangement 10. As shown, arrangement 10 includes a pair of separate fiber optic cables 12 and 14, the terminations of which are spliced together within a splice housing 16. The details regarding the nature of the splicing arrangement are well-known in the art and are not considered to be relevant to an understanding of the tool and method of the present invention. As mentioned above, splice housing 16 is sealed within an encapsulant 18, where encapsulant 18 functions to prevent water and other debris from entering splice housing 16. A common material used as an encapsulant is a foam rubber-based solution, such as parafinic hydrocarbon, that cures upon application.

Figure 2:
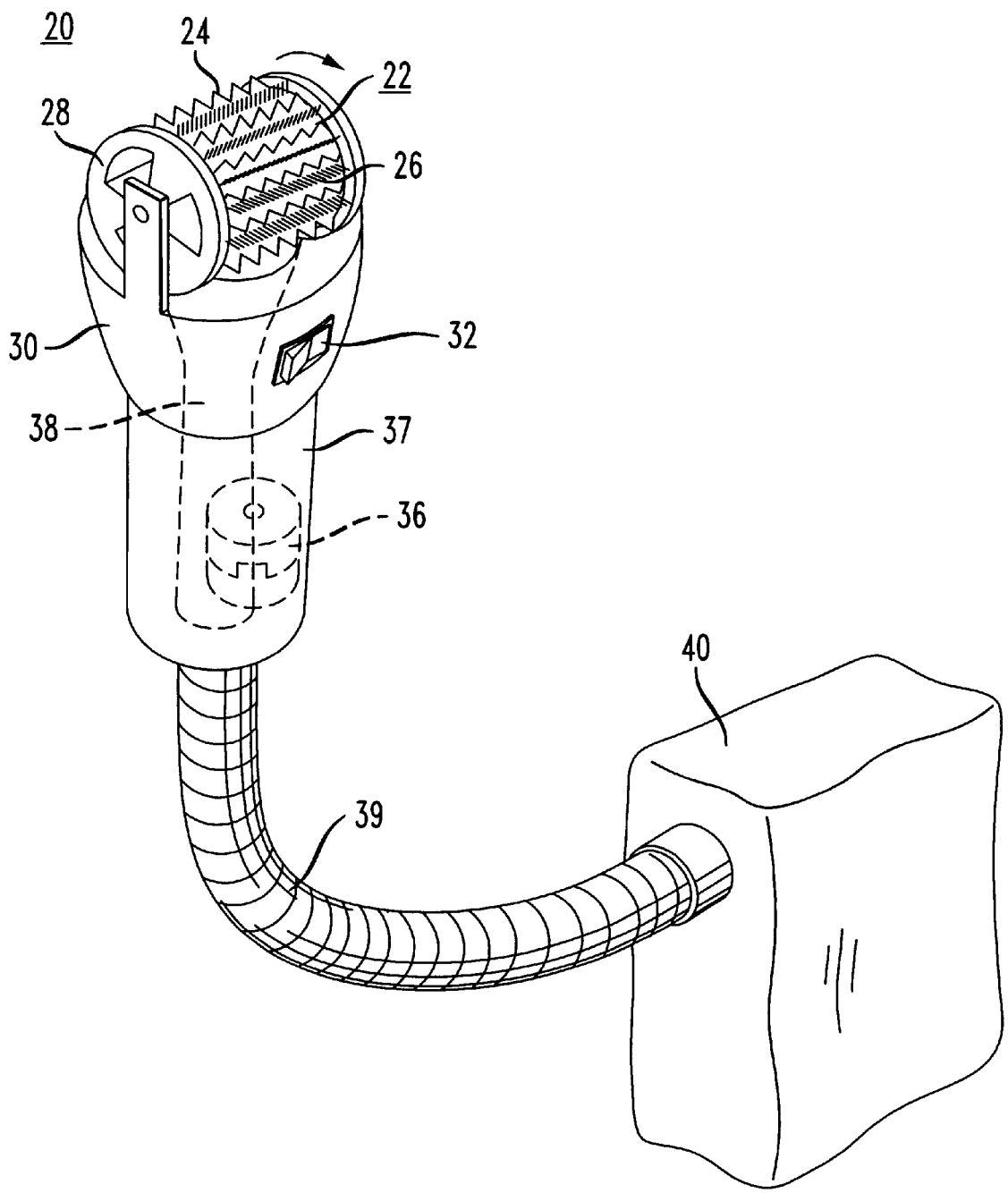
FIG. 2 illustrates an exemplary encapsulant removal tool formed in accordance with the present invention.

When splice housing 16 needs to be accessed to repair or replace the internal splice, encapsulant 18 (or a portion thereof) must be removed. A conventional prior art technique for the removal requires the use of a "skinning" knife, a hand tool used by the repair personnel. Improper use of this tool, however, may result in cutting the person performing the repair and/or damaging the fiber cables associated with the splice housing. FIG. 2 illustrates a hand-held, motor-driven cutting tool 20, formed in accordance with the present invention, that may be used to remove encapsulant material surrounding a fiber optic cable splice. Cutting tool 20 includes a cutting head 22, a cylindrical, rotating, piece part comprising alternating rows of cutting blades 24 and brushes 26. Cutting head 22 is coupled to a drive wheel 28, where drive wheel 28 is activated by a battery-operated motor contained within motor housing 30. When turned "on" by an activation switch 32, drive wheel 28 functions to rotate cutting head 22, as indicated by the arrow in FIG. 2. When rotating cutting head 22 is brought into contact with encapsulant material (such as encapsulant 18 illustrated in FIG. 1), the alternating rows of blades 24 and brushes 26 function to cut encapsulant 18 and clear it out of the cutting area, respectively.

In a preferred embodiment of the present invention, the encapsulant debris created by the cutting process is drawn by a vacuum into a collection receptacle. Referring to FIG. 2, cutting tool 20 may be formed to include a vacuum motor 36, contained within a vacuum housing 37 and also battery operated. In the embodiment shown in FIG. 2, vacuum housing 37 is depicted as attached to motor housing 30. Other arrangements are possible and, in particular, the positions of vacuum housing 37 and motor housing 30 may be reversed. Vacuum motor 36 may also be activated by switch 32. Cutting tool 20 is further formed to include a vacuum port 38 (shown in phantom in FIG. 2) which is coupled to vacuum motor 36 and extends from cutting head 22 into a collection tube 39. The opposing end of collection tube 39 is connected to a collection receptacle 40. Therefore, when cutting tool 20 is activated and drawing a vacuum, the encapsulant debris created by blades 24 will be drawn through vacuum port 38 into tube 39 and thereafter be deposited in collection receptacle 40.

Figure 3:
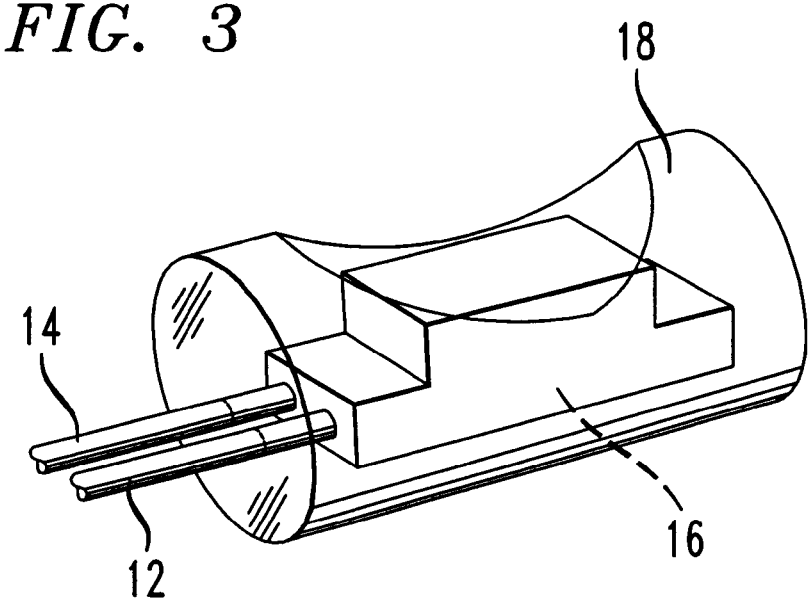
FIG. 3 illustrates an exemplary fiber optic cable splice, with a portion of the outer encapsulant removed using the tool of FIG. 2.

FIG. 3 illustrates an exemplary fiber optic splice with a portion of encapsulant 18 removed using cutting tool 20 of the present invention. The amount of encapsulant that needs to be removed is at the discretion of the repair personnel, where collection receptacle 40 must be properly sized so as to allow for the collection of all encapsulant debris. Once the cutting operation is complete, receptacle 40 may be removed from tube 39 so that the receptacle may be emptied, then re-attached.

Although the cutting tool described above utilizes a battery-operated motor and vacuum, it is to be understood that various other arrangements for providing power to both the drive motor and vacuum may be used, including but not limited to, AC attachments to an external power supply. The battery-operated embodiment, however, is considered to be preferable for most cable splice situations, where repair personnel are "in the field" and, as such, may not be near a source of electricity. Additionally, various other types of collection receptacles other than the bag illustrated in FIG. 2 may be employed. Other and further arrangements are possible and all are considered to fall within the spirit and scope of the present invention as defined by claims appended hereinbelow.

What is claimed is:

1. A cutting tool for removing material surrounding a cable splice, said cutting tool comprising a cylindrical, rotatable cutting head, said cylindrical rotatable cutting head including rows of cutting blades disposed around the cylindrical surface of said cutting head and rows of brushes disposed around said cylindrical surface of said cutting head in an interleaved relationship with said rows of cutting blades;

a drive wheel coupled to said cylindrical, rotatable cutting head for imparting rotating motion to said cutting head when activated; and a drive motor coupled to said drive wheel, said drive motor for rotating said drive wheel and the cylindrical, rotatable cutting head in a manner capable of cutting and removing said material when said cutting head is brought into contact with said splice.

2. A cutting tool as defined in claim 1 wherein the cutting tool further comprises a vacuum source;

a vacuum motor for activating said vacuum source;

a vacuum port coupled to said vacuum source and having a first termination at said cutting head and a second, opposing termination; and a debris collection receptacle coupled to the second opposing termination of said vacuum port, wherein upon activation of said vacuum source material debris from the removal process is deposited in said debris collection receptacle.

3. A cutting tool as defined in claim 2 wherein the cutting tool further comprising a collection tube coupled between the cutting head and the debris collection receptacle, said collection tube disposed to cover said vacuum port.

4. A cutting tool as defined in claim 2 wherein the drive motor and the vacuum motor are battery operated.

5. A cutting tool as defined in claim 1 wherein the drive motor is battery operated.

* * * * *